Patented May 20, 1941

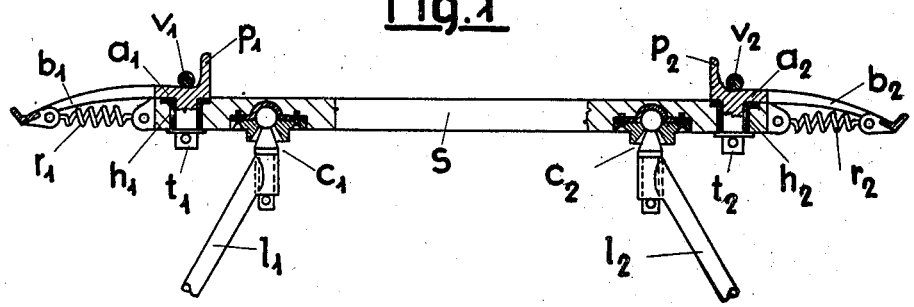
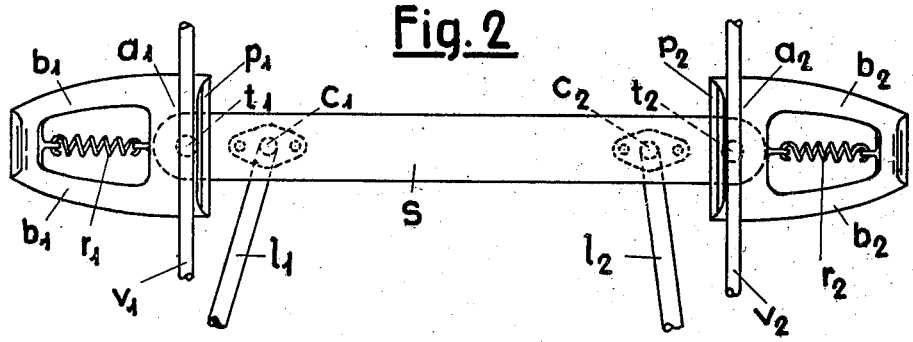
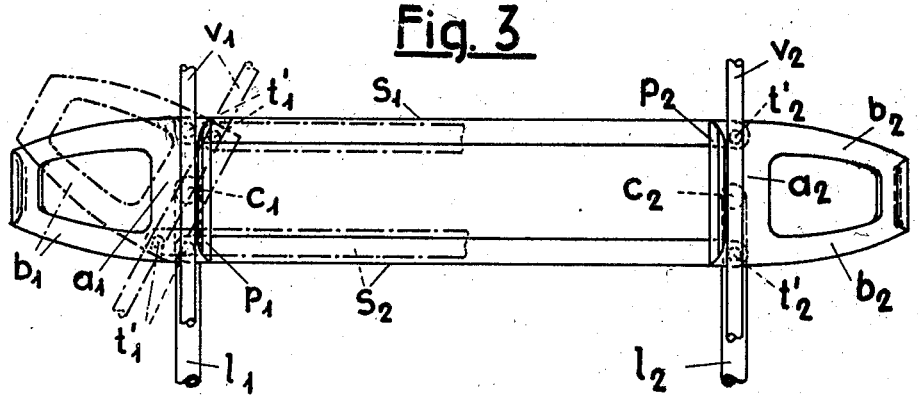

2,242,839

UNITED STATES PATENT OFFICE 2,242,839

CURRENT COLLECTOR FOR TROLLEY BUSES AND OTHER ELECTRIC ROAD VEHICLES SUPPLIED FROM OVERHEAD WIRES

Ferenc Szalay, Budapest, Hungary, assignor to Inventio Patentverwertungs-Aktiengesellschaft, Glarus, Switzerland, a company of Switzerland Application February 21, 1939, Serial No. 257,726
In Hungary June 17, 1938

6 Claims. (Cl. 191—57)

The invention comprises improvements in or relating to current collectors for trolley buses and other electric road vehicles supplied from overhead wires. In the specification of my copending application Serial No. 257,725 filed February 21, 1939, I have described a current collecting assembly for trolley buses and like vehicles comprising a single trolley pole and two or more collecting shoes appropriated to the several overhead wires respectively and supported in electrically insulated and spaced relationship from the trolley pole by means allowing universal rotational movement of the shoes in relation to the pole. I have also described in that specification an arrangement of the assembly in which the several shoes have only two guiding flanges between them, the flanges being so arranged on the shoes as to limit the lateral movement of the shoes in relation to the wires. An advantage of the arrangement in which the shoes are supported in their spaced relationship and only two flanges are provided is that it enables a reduction to be made in the number or widths in the gaps in the trolley wires at cross-overs and junctions. The supporting means for the shoes in the arrangement described in the above-mentioned co-pending application, however, tend to become unduly heavy when the assembly is intended for use with overhead wires spaced a considerable distance apart and it is an object of the present invention to provide a double-terminal current collector having only two guiding flanges in which this disadvantage is reduced.

The invention provides an overhead double-terminal current collector for an electric road vehicle comprising two trolley poles supporting respectively two sliding contacts of which each has only a single guiding flange, the two contacts being connected together by insulated means which maintain the contacts and flanges in spaced relationship corresponding to the separation of the overhead wires and the flanges being arranged either both to engage the adjacent or inner sides of the overhead wires or both to engage the opposed or outer sides of the wires and thereby to limit the lateral movement of the contacts in relation to the wires.

In the preferred form of the invention the flanges are of substantial length considered in the running direction and are pivotally supported for movement in relation to the connecting means about axes which are substantially perpendicular to the sliding contacts. The sliding contacts may also be pivotally supported and be arranged for movement with their respective flanges.

The two poles may be attached to the roof of the vehicle for swinging movement with respect to the vehicle by means of the usual trolley base and the poles together with the base and connecting means may constitute a frame of trapezium or parallelogram shape.

Two specific embodiments of the invention will now be described by way of example with reference to the accompanying drawing in which:

Figure 1 is a front view partly in section of one form of current collector,

Figure 2 is a plan of the collector shown in Figure 1, and

Figure 3 is a plan of a second form of current collector.

Like reference letters indicate like parts in the several figures of the drawing.

In the arrangement shown in Figure 1 the trolley poles $11$ and $12$ which are supported from the roof of the vehicle are connected to form a trapezium by means of an insulated crosspiece $s$. The connections $c_1$ and $c_2$ between the trolley poles and the crosspiece are constituted by ball and socket joints. Current collector shoes $a_1$ and $a_2$ are pivotally attached to the crosspiece $s$ for rotation about vertical axes by means of pins $t_1$ and $t_2$ working in bushes $h_1$ and $h_2$. The shoes are each provided with a single flange $p_1$ and $p_2$ for engagement with the adjacent or inner sides of the overhead wires $v_1$ and $v_2$. The shoes are provided with laterally extending arms $b_1$ and $b_2$ arranged to engage the wire should it slip off the shoe and to tend to lead it back into position, and tension springs $r_1$ and $r_2$ connect the outer ends of these arms to the ends of the crosspiece $s$. The arrangement of these springs is such that they tend to maintain the flanges in parallel relationship and perpendicular to the length of the crosspiece $s$. The flanges are, however, free to move about their pivot points against the action of the springs to adjust themselves to the overhead wires.

In the second example, shown in Figure 3, the shoes $a_1$ and $a_2$ are connected by two insulated crosspieces $s_1$ and $s_2$ which are pivoted to the shoes at $t_1'$ and $t_2'$, and which form, together with the shoes, a four-sided system of parallel motion links. The poles $l_1$ and $l_2$ are pivotally attached to the shoes at $c_1$ and $c_2$ and the arrangement is such that the shoes may, as indicated in dotted lines, adjust themselves to the overhead wires in relation to the poles. In this example, the poles are directly attached to the shoes and may be in direct electrical connection whereas in the arrangement shown in Figures 1 and 2, the flexible cable connections between the poles and the shoes are required.

The collector described in either of the above examples may be modified, if desired, by attaching the collector shoes rigidly to the crosspiece or to the poles and by making only the flanges $p_1$ and $p_2$ rotatable about vertical axes. Further the sliding contacts may be arranged for independent pivotal movement about a horizontal axis extending transversely to the length of the contacts.

What I claim is:

1. An overhead double-terminal current collector for an electric road vehicle comprising two trolley poles supporting respectively two sliding contacts of which each has only a single guiding flange, the two contacts being connected together by insulated means which maintain the contacts and flanges in spaced relationship corresponding to the separation of the overhead wires and the flanges being arranged both to engage the adjacent sides of the overhead wires and thereby to limit the lateral movement of the contacts in relation to the wires, said flanges being of substantial length in the running direction and means for pivotally supporting said flanges for movement in relation to the connecting means about axes which are substantially perpendicular to the sliding contacts.

2. An overhead double-terminal current collector for an electric road vehicle compristrolley poles supporting respectively two sliding contacts of which each has only a single guiding flange, the two contacts being connected together by insulated means which maintain the contacts and flanges in spaced relationship corresponding to the separation of the overhead wires and the flanges being arranged both to engage the adjacent sides of the overhead wires and thereby to limit the lateral movement of the contacts in relation to the wires, said flanges being of substantial length in the running direction, means for pivotally supporting said flanges for movement in relation to the connecting means about axes which are substantially perpendicular to the sliding contacts, and means for pivotally supporting said sliding contacts for pivotal movement with their respective flanges.

3. An overhead double-terminal current collector for an electric road vehicle comprising two trolley poles supporting respectively two sliding contacts of which each has only a single guiding flange, the two contacts being connected together by insulated means which maintain the contacts and flanges in spaced relationship corresponding to the separation of the overhead wires and the flanges being arranged both to engage the adjacent sides of the overhead wires and thereby to limit the lateral movement of the contacts in relation to the wires, means pivotally supporting each of said flanges for movement relative to said connecting means and springs cooperating with said flanges for maintaining said flanges in parallel relationship.

4. An overhead double-terminal current collector for an electric road vehicle comprising two trolley poles supporting respectively two sliding contacts of which each has only a single guiding flange, the two contacts being connected together by insulated means which maintain the contacts and flanges in spaced relationship corresponding to the separation of the overhead wires and the flanges being arranged both to engage the adjacent sides of the overhead wires and thereby to limit the lateral movement of the contacts in relation to the wires, means pivotally supporting each of said flanges for movement relative to said connecting means, springs cooperating with said flanges for maintaining said flanges in parallel relationship, and said springs tending to maintain said flanges at right-angles to a line joining their points of attachment to the connecting means.

5. An overhead double-terminal current collector for an electric road vehicle comprising two trolley poles supporting respectively two sliding contacts of which each has only a single guiding flange, the two contacts being connected together by insulated means which maintain the contacts and flanges in spaced relationship corresponding to the separation of the overhead wires and the flanges being arranged both to engage the adjacent sides of the overhead wires and thereby to limit the lateral movement of the contacts in relation to the wires, and said connecting means for said contacts comprising a four-sided system of parallel motion links with said flanges attached to opposite sides for movement therewith and said poles being attached to the same pair of sides respectively.

6. An overhead double-terminal current collector for an electric road vehicle comprising two trolley poles supporting respectively two sliding contacts of which each has only a single guiding flange, the two contacts being connected together by insulated means which maintain the contacts and flanges in spaced relationship corresponding to the separation of the overhead wires and the flanges being arranged both to engage the adjacent sides of the overhead wires and thereby to limit the lateral movement of the contacts in relation to the wires and said sliding contacts are arranged for independent pivotal movement about a vertical axis extending transversely of the length of said contacts.

FERENC SZALAY.